US009123053B2

(12) United States Patent
Murray et al.

(10) Patent No.: US 9,123,053 B2
(45) Date of Patent: Sep. 1, 2015

(54) ANALYZING READING METRICS TO GENERATE ACTION INFORMATION

(71) Applicant: Google Inc., Mountain View, CA (US)

(72) Inventors: Abraham Phelps Murray, Scituate, MA (US); David Eric Staff, Arlington, MA (US); Jeremy Faller, Arlington, MA (US); Michael Salomon Morton, Lyme, NH (US)

(73) Assignee: Google Inc., Mountain View, CA (US)

( * ) Notice: Subject to any disclaimer, the term of this patent is extended or adjusted under 35 U.S.C. 154(b) by 280 days.

(21) Appl. No.: 13/709,262

(22) Filed: Dec. 10, 2012

(65) Prior Publication Data

US 2014/0164593 A1 Jun. 12, 2014

(51) Int. Cl.
*G06F 15/173* (2006.01)
*G06Q 30/02* (2012.01)

(52) U.S. Cl.
CPC ...................................... *G06Q 30/02* (2013.01)

(58) Field of Classification Search
CPC ..................................................... G06Q 30/02
USPC .................................................. 709/223, 224
See application file for complete search history.

(56) References Cited

U.S. PATENT DOCUMENTS

| 8,260,915 | B1 | 9/2012 | Ashear | |
| 8,874,731 | B1 * | 10/2014 | Puppin | 709/224 |
| 2011/0087955 | A1 * | 4/2011 | Ho et al. | 715/230 |
| 2011/0195388 | A1 | 8/2011 | Henshall et al. | |
| 2012/0084150 | A1 | 4/2012 | Nussel et al. | |
| 2012/0154372 | A1 * | 6/2012 | Buck et al. | 345/418 |
| 2012/0196577 | A1 * | 8/2012 | Kwong | 455/414.1 |
| 2013/0151952 | A1 * | 6/2013 | Yamamoto et al. | 715/243 |
| 2013/0227682 | A1 * | 8/2013 | Tse | 726/22 |
| 2014/0164892 | A1 * | 6/2014 | Nickolov et al. | 715/205 |
| 2014/0214578 | A1 * | 7/2014 | Kirkpatrick | 705/26.1 |
| 2014/0289241 | A1 * | 9/2014 | Anderson | 707/736 |

FOREIGN PATENT DOCUMENTS

JP 07-141398 A 6/1995
WO WO 2012/006256 A2 1/2012

OTHER PUBLICATIONS

Provisional Patent Application filed for U.S. Appl. No. 61/350,965, filed Jun. 3, 2010, 61 Pages.
PCT International Search Report and Written Opinion for PCT/US2013/073172, Mar. 26, 2014, 8 Pages.

* cited by examiner

*Primary Examiner* — Mohamed Wasel
(74) *Attorney, Agent, or Firm* — Fenwick & West LLP

(57) ABSTRACT

Data reports are received from a plurality of clients including action reports and timing reports. Action reports describe actions performed by users of the clients at location within an eBook. Timing reports describe reading speeds of users of the clients. The data reports are analyzed to identify an action that is performed by the users of the clients at a location within the eBook frequently relative to other actions. Action information is generated for automatically performing the identified action at the location within the eBook. The action information is transmitted to a client. The client is configured to automatically perform the action at the location within the eBook. The reading location of a user of the client is determined based on the timing reports.

17 Claims, 5 Drawing Sheets

ANALYZING READING METRICS TO GENERATE ACTION INFORMATION

FIELD OF DISCLOSURE

The invention generally relates to electronic books (eBooks) and particularly relates to analyzing reading metrics about the reading of such books.

BACKGROUND INFORMATION

Many people are transitioning from reading physical books to reading eBooks, which have many advantages over physical books, such as more portability, the ability to access the eBook from multiple electronic devices, and text search capability. In addition, eBooks are also easier to purchase and are perceived as environmentally-friendly. However, reading devices for eBooks do not take full advantage of opportunities for improving the reading experience that are possible with eBooks.

SUMMARY

The above and other issues are addressed by a computer-implemented method, computer system, and non-transitory computer-readable storage medium for using eBook reading metrics to generate action information. An embodiment of the method includes receiving data reports from a plurality of clients, the data reports comprising action reports describing actions performed by users of the clients at locations within an eBook. The data reports are analyzed to identify an action that is performed by the users of the clients at a location within the eBook. Action information is generated for automatically performing the identified action at the location within the eBook. The action information is transmitted to a client. The client is adapted to use the action information to automatically perform the action at the location within the eBook.

An embodiment of the computer system for using eBook reading metrics to generate action information includes a non-transitory computer-readable storage medium having executable computer program instructions. The instructions include instructions for receiving data reports from a plurality of clients, the data reports comprising action reports describing actions performed by users of the clients at locations within an eBook. The data reports are analyzed to identify an action that is performed by the users of the clients at a location within the eBook. Action information is generated for automatically performing the identified action at the location within the eBook. The action information is transmitted to a client. The client is adapted to use the action information to automatically perform the action at the location within the eBook. The computer system also includes a processor for executing the computer program instructions.

An embodiment of the medium stores executable computer program instructions for using eBook reading metrics to generate action information. The instructions perform steps including receiving data reports from a plurality of clients, the data reports comprising action reports describing actions performed by users of the clients at locations within an eBook. The data reports are analyzed to identify an action that is performed by the users of the clients at a location within the eBook. Action information is generated for automatically performing the identified action at the location within the eBook. The action information is transmitted to a client. The client is adapted to use the action information to automatically perform the action at the location within the eBook.

DETAILED DESCRIPTION

The figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
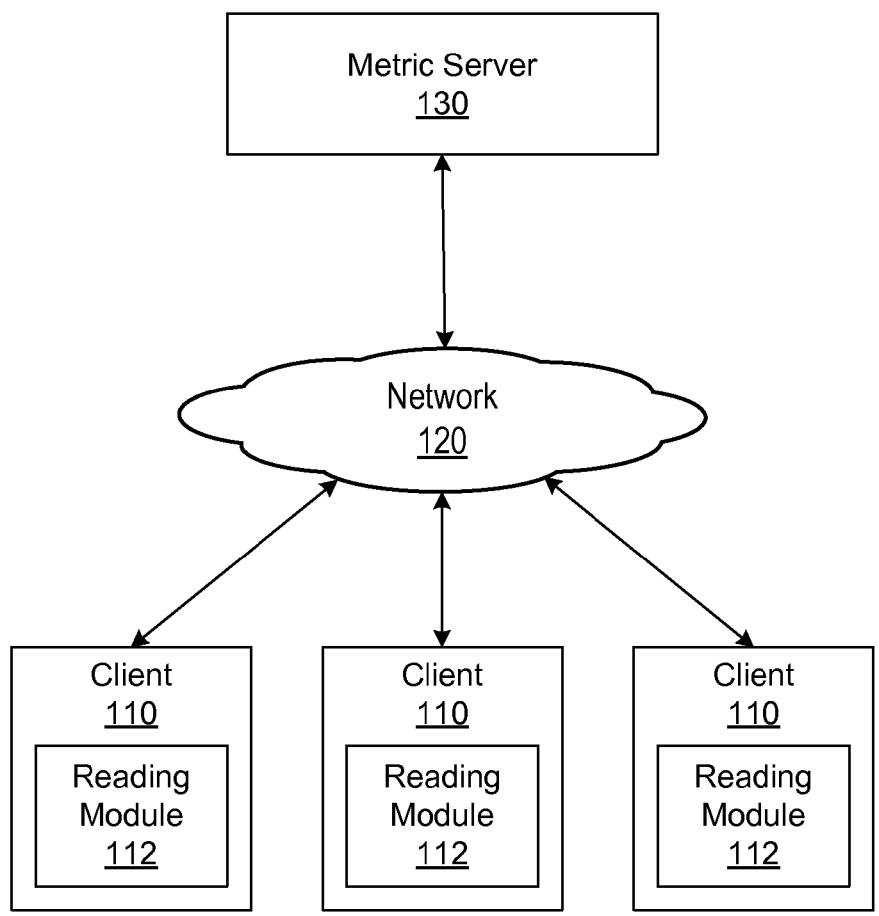
FIG. 1 is a high-level block diagram illustrating an environment for analyzing eBook reading metrics and generating action information in accordance with one embodiment.

FIG. 1 is a high-level block diagram illustrating an environment 100 for analyzing eBook reading metrics and generating action information in accordance with one embodiment. As shown, the environment 100 includes multiple clients 110 connected to a metric server 130 via a network 120. While only one metric server 130 and three clients 110 are shown in FIG. 1 for clarity, embodiments can have multiple servers and many clients. Moreover, the metric server 130 may be implemented as cloud-based service distributed across multiple physical servers.

The clients 110 are electronic devices used by one or more users to read eBooks. A client 110 can be, for example, a mobile phone, desktop, laptop, or tablet computer, or a dedicated eBook reader ("eReader"). The client 110 may execute one or more applications that support activities including reading eBooks and browsing and obtaining content available from servers on the network 120. For example, in one embodiment the client 110 is a computer running a web browser displaying eBook content from a remote website on the network 120. An eBook is a form of electronic content that is primarily textual in nature. The content of an eBook may be, for example, a novel, a textbook, or a reference book. As used herein, the term "eBook" also includes other electronic content that is primarily textual, such as magazines, journals, newspapers, or other publications.

The clients 110 include display screens that show portions of eBooks to the users. The portion of text shown on a display screen at one time is referred to as a "page" of the eBook. The amount of text shown on a page by a given client 110 depends upon multiple variables including the size of client's display screen and characteristics of the text such as typeface, font size, margin spacing and line spacing.

The user of a client 110 changes the pages of an eBook by issuing page-turn commands. The type of command issued by the user can vary based on the client 110. For example, some clients 110 have physical page turn buttons that the user presses to advance to the next or previous page. Other clients 110 have touch-sensitive display screens and the user issues a page-turn command by gesturing on the screen.

In one embodiment, the clients 110 include reading modules 112 that record the time intervals (i.e., elapsed time) between page-turn commands issued by the users. Depending upon the embodiment, the reading modules 112 can be integrated into firmware executed by the clients 110, integrated into operating systems executed by the clients, or contained within applications executed by the clients. For example, a reading module 112 may be implemented as JAVASCRIPT code executed by a web browser on a client 110. Users may be provided with an opportunity to control whether time intervals are recorded.

During normal use of the client 110 for reading an eBook, the user will issue page-turn commands as the user reads each page and advances to the next page. For clients 110 that replace the entire page of text in response to a page-turn command, the time interval between sequential forward page-turn commands issued by a user is a proxy for the amount of time it took the user to read the text on the page. Hence, the time interval is referred to as a "reading time interval." The reading time interval will vary for different users having different reading speeds, and will also vary depending upon the amount of text shown on each page and the complexity of the text. Reading time intervals may also include data identifying the day, date and/or time at which the reading identified by a reading time interval occurred.

Clients may also read text by scrolling rather than advancing through discrete pages in a paginated eBook. In one embodiment, time intervals are measured between locations in the text. The locations may be predetermined or automatically generated periodically throughout the text of an eBook. The time interval between sequential locations being scrolled onto, or off of, a screen may serve as a proxy for the amount of time it took the user to read that section of text. In another embodiment, the reading position of a user may be directly observed through eye-tracking, and the time interval for reading between two sequential locations can be recorded.

In addition to recording reading time intervals, the reading modules 112 may record additional actions performed on the clients 110 while eBook are read. Users may be provided with an opportunity to control whether actions are recorded. During normal use of the client 110 for reading an eBook, the user may perform actions such as looking up the definitions of word(s), requesting the translation of word(s), and adding annotations. For such actions, the reading modules 112 record data describing the action, such as the location in the eBook where the action was performed and a timestamp indicating when the action was performed. The location in the eBook may be a reference to a portion of text in the eBook, such as a word, sentence, paragraph, or page in the eBook. The reading module 112 may also record data indicating the geographic location of the user at the time an action was performed or reading time interval was recorded. In one embodiment, permission is requested from the user before detecting and recording the geographic location. The geographic location data is not detected or recorded absent the user's permission.

The reading modules 112 send data reports to the metric server 130 describing how the clients 110 are used for reading eBooks (i.e., describing reading metrics). The data reports include timing reports describing the recorded reading time intervals. In addition, the data reports include action reports describing the actions performed when reading pages of eBooks. In one embodiment, permission is requested from the user for transmitting timing reports and/or action reports to the metric server 130.

The reading modules 112 also receive timing and action information from the metric server 130. A reading module 112 uses this information to automatically perform certain actions when the user reads a certain portion of an eBook, such as automatically turning pages, defining words, highlighting passages, etc. For example, the action information may instruct the reading module 112 to automatically define a word for which a definition is frequently requested by users of the clients 110.

In situations in which the entities discussed here collect personal information about users, or may make use of personal information, the users may be provided with an opportunity to control whether programs or features collect user information or to control whether and/or how to receive content from the metric server 130 that may be relevant to the user. In addition, certain data may be treated in one or more ways before it is stored or used, so that that personally identifiable information is removed. For example, a user's identity may be treated so that no personally identifiable information can be determined for the user. Thus, the user may have control over how information is collected about the user and used by the metric server 130.

The metric server 130 is a computer or other electronic device that uses the data reports received from the clients 110 to generate timing and action information describing the eBooks and users. The metric server 130 may be operated by an entity that provides eBooks and other electronic content to the clients 110 or may be operated by a different entity.

In general, the metric server 130 uses the received data reports to generate timing information regarding the reading of eBooks and to provide the timing information, and generated action information, to the clients 110 in order to enhance the users' reading experiences. For example, the metric server 130 may use data reports received from the various clients 110 to determine the average time required by a group of users to read a given portion of an eBook, and to determine the reading speeds of individual users. In one embodiment, the metric server 130 provides timing and action information to the reading modules 112 of the clients 110 instructing a reading module 112 to automatically perform an action based at least in part on the user's reading speed. For example, the action information may cause the definition of a word to be automatically displayed as the user reads the word. Additionally, the metric server 130 may send a reading module 112 timing information that allows the reading module to display individual reading statistics for the user, as well as a dashboard comparing the user's reading statistics with equivalent statistics for other users.

The network 120 represents the communication pathway between the metric server 130 and clients 110. In one embodiment, the network 120 uses standard communications technologies or protocols and can include the Internet. Thus, the network 120 can include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 120 can be represented using technologies or formats including image data in binary form (e.g. Portable Network Graphics (PNG), the hypertext markup language (HTML), the extensible markup language (XML), etc. In addition, all or some links can be encrypted using conventional encryption technologies such as secure sockets layer (SSL), transport layer security (TLS), virtual private networks (VPNs), Internet Protocol security (IPsec), etc. In another embodiment, the entities on the network 120 can use custom or dedicated data communications technologies instead of, or in addition to, the ones described above.

Figure 2:
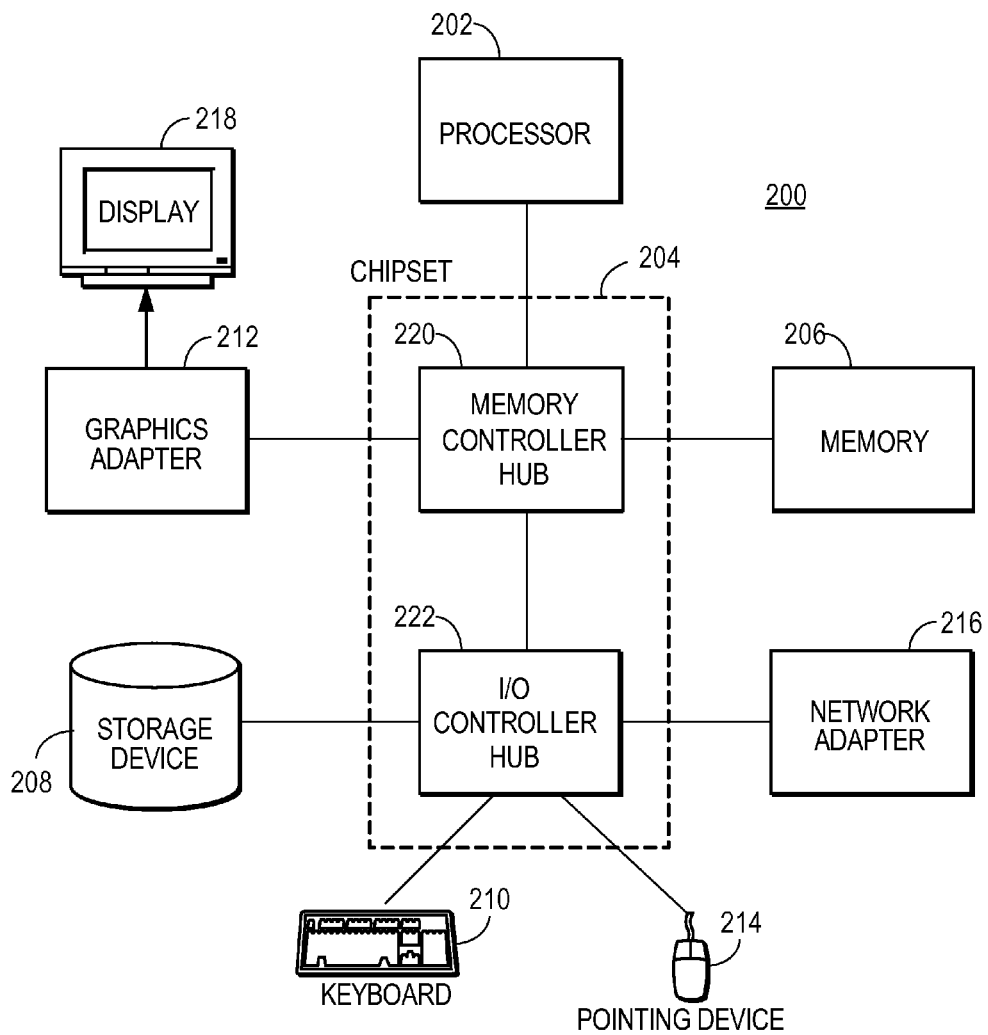
FIG. 2 is a high-level block diagram illustrating an example of a computer for use as a metric server or a client, in accordance with one embodiment.

FIG. 2 is a high-level block diagram illustrating an example of a computer 200 for use as a metric server 130 or a client 110, in accordance with one embodiment. Illustrated is at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is used in combination with the keyboard 210 to input data into the computer 200. The graphics adapter 212 displays images and other information on the display device 218. In some embodiments, the display device 218 includes touch screen capability for receiving user input and selections. The network adapter 216 couples the computer system 200 to the network 120. Some embodiments of the computer 200 have different or other components than those shown in FIG. 2. For example, the metric server 130 can be formed of multiple blade servers and lack a display device, keyboard, and other components.

The computer 200 is adapted to execute computer program modules for providing functionality described herein. As used herein, the term "module" refers to computer program instructions and other logic used to provide the specified functionality. Thus, a module can be implemented in hardware, firmware, or software. In one embodiment, program modules formed of executable computer program instructions are stored on the storage device 208, loaded into the memory 206, and executed by the processor 202.

Figure 3:
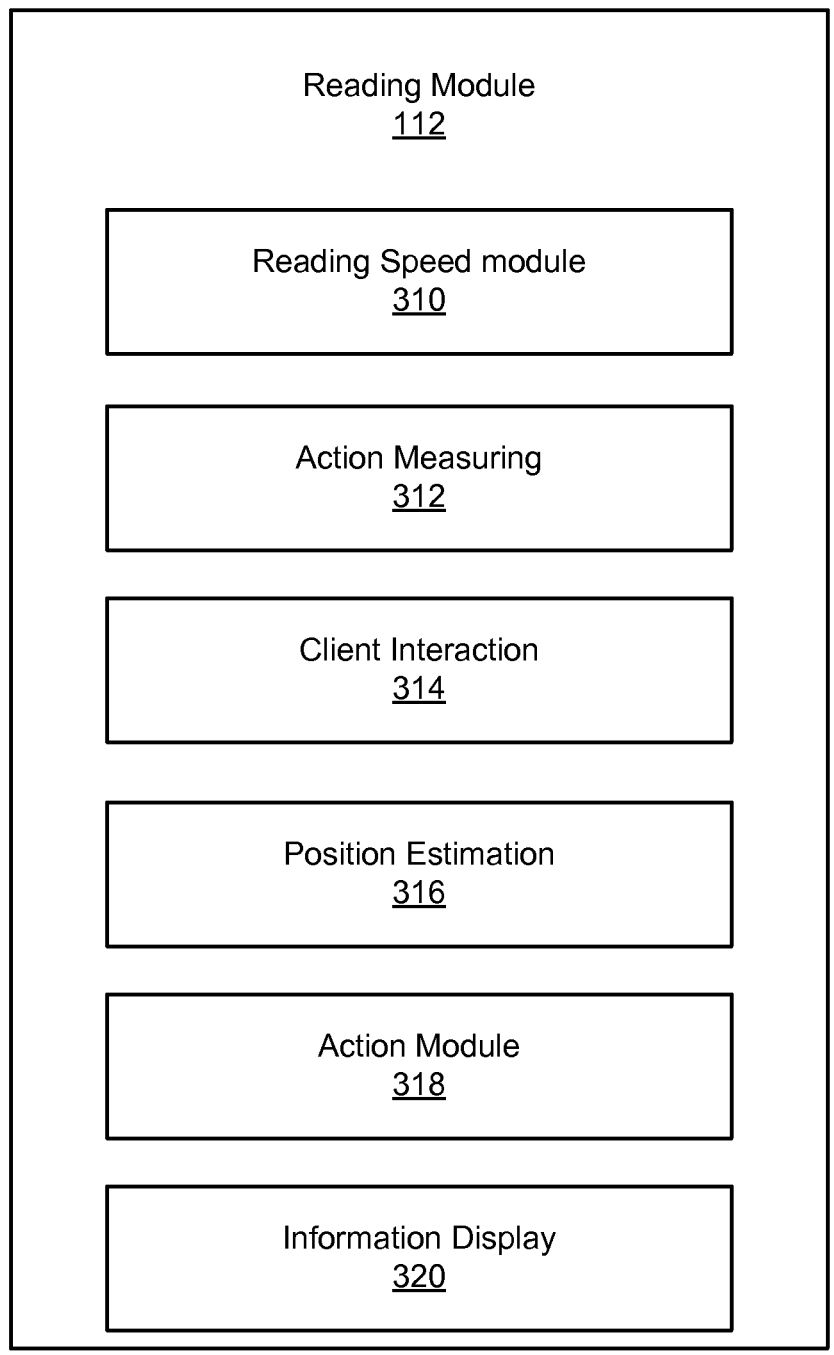
FIG. 3 is a high-level block diagram illustrating a detailed view of the reading module of a client according to one embodiment.

FIG. 3 is a high-level block diagram illustrating a detailed view of the reading module 112 of a client 110 according to one embodiment. As shown in FIG. 3, multiple modules are included within the reading module 112. In some embodiments, the functions are distributed among the modules in a different manner than described herein. Moreover, the functions are performed by other entities in some embodiments, such as by the metric server 130.

A reading speed module 310 is configured to collect information describing the reading speed of a user. Users may be provided with an opportunity to control whether reading speed information is collected. In one embodiment, the reading speed module 310 measures times between page turn commands and stores the time periods between page turn commands as intervals. In one embodiment, the reading speed module 310 activates a timer upon detecting a page-turn command and uses the timer to measure the time elapsed until a new page-turn command is detected. The reading speed module 310 stores the measured time intervals in association with the pages of the eBooks to which they pertain. The reading speed module 310 may measure only forward page-turn commands because backward page-turn commands are less likely to be reflective of a user's reading speed. In addition, the reading speed module 310 may measure intervals between multiple page-turn commands and may activate the timer in response to different events, such as the display of a new page instead of the detection of a page turn command. Different embodiments of the reading speed module 310 may measure time intervals in various different ways. For example, the reading speed module 310 may utilize eye tracking to locate where on a page a user is currently reading and determine the user's reading speed based on the progression of the user's eyes.

An action measuring module 312 measures and records actions performed at locations within the eBook text by the user while reading. The action measuring module 312 may record actions including looking up the definitions of word(s), requesting the translation of word(s), adding annotations, and other actions performed by the client 110. The action measuring module 310 stores the recorded actions in association with the locations in the eBooks to which they pertain and/or the time at which the action occurred. The action measuring module 312 may also omit actions that may be unintentional or that are unusual and are likely to incorrectly characterize actions of a user.

A client interaction module 314 sends data reports to the metric server 130. A data report may include, for example, an identifier of the client 110 sending the report, an identifier of the eBook being read on the client, an identifier of the user of the client, and a description of the text displayed on the page associated with the report (i.e., the beginning and endpoints of the text on the page). The information in a data report may be anonymous to avoid disclosing private information about the user or client 110. In one embodiment, if a user does not provide explicit approval to transmit data reports, such as by interacting with a button on an approval dialog box displayed on the client 110, the client interaction module 314 will not transmit data reports.

The data reports include timing reports and action reports. A timing report describes the reading speed of a user of a client 110 as measured by the reading speed module 310. In addition to the information described above, a timing report may include, for example, reading time intervals and a description of the portion of the eBook to which the time interval pertains (e.g., the beginning and endpoints of the text portion read in the time interval). A timing report may describe time intervals for one or more pages. An action report, in turn, describes an action performed at a client 110 as recorded by the action measuring module 312. In addition to the information described above, an action report may include an indication of the action that was performed, a description of the location of the eBook for which the action was performed, the time at which the action occurred, and the estimated reading position of the user when the action occurred.

The client interaction module 314 may send the data reports contemporaneously with when the timing intervals and actions are observed or send multiple reports in batch. For example, the client interaction module 314 may store the reports if network 120 connectivity is absent or limited and then send the reports once connectivity becomes available, or send reports at the completion of a chapter or other location within the text. Likewise, the client interaction module 314 may send reports upon initiating or deactivating of the reading functionality of the client 110.

In addition, the client interaction module 314 receives timing information and action information from the metric server 130. The timing information may indicate the user's reading speed or describe other timing-related aspects of the eBook enabling the reading module 112 to determine a reader's current location in an eBook. "Reading speed" generally refers to the amount of text a user can read in a specified amount of time. For purposes of convenience, reading speed is often described herein as words per minute (WPM). However, reading speed can be represented in other ways, such as an amount of time required to read a word or other portion of text. The action information includes instructions to the reading module 112 from the metric server 130 identifying actions that should be automatically performed by the reading module 112 such as automatically defining a word or showing annotations. In one embodiment, permission is requested from the user to automatically perform actions as instructed by the metric server 130. Collectively, the timing and action information describe reading statistics of the users and eBooks, such as how quickly a given user or group of users tend to read portions of specific eBooks, actions performed in those portions of the eBooks, etc.

A position estimation module 316 estimates the user's current reading location on a displayed page of an eBook based on timing information received from the metric server 130. In one embodiment, the position estimation module 316 estimates the user's reading location based on the user's reading speed. For example, the position estimation module 316 may determine the user's reading location by measuring the time elapsed since the page was turned and comparing the elapsed time with the user's reading speed to determine how far into the displayed page the user has read. Users may be provided with an opportunity to control whether their reading position is estimated or otherwise determined.

The action module 318 performs actions as instructed by the action information received from the metric server 130. In some cases, the action module 318 measures the user's current reading position based on output from the position estimation module 316 to perform actions when a user is reading a target location in the text. In one embodiment, the target location is transmitted to the client 110 as part of the action information.

The actions that may be performed by the action module 318 can vary. The action module 318 may place a bookmark at an estimated reading position based on a command from the user. In one embodiment, the estimated location of the bookmark may be adjusted based on the reading speed of the user and the reading speeds of other readers of the particular passage being read. Another action the action module 318 may perform is automatically turning a page as a user's estimated reading position reaches the end of the page. Similarly, the reading module 112 may automatically perform other relevant actions such as displaying the definition or translation of a word as the user's estimated reading position approaches the position of the word. Likewise, the reading module 112 may automatically display annotations when the user reads a specific portion of an eBook.

An information display module 320 displays information described by the timing and action information received from the metric server 130 to the user. The types of information displayed may vary in different embodiments. The information display module 320 may display statistics describing metrics tracked on an individual level, on a book level, or various other aggregate levels such as age, gender, time of day the reading occurred, or genre. For example, average reading speed or time spent reading may be divided into certain times of the day and presented to the user to compare. A user can also be shown a timeline of when the user read and how fast or how much the user read during those times. The information display module 320 may display the statistics textually or graphically. For example, the information display module 320 may display a dialog box or other user interface (UI) element having a dashboard that lists the user's time spent per chapter, time spent per book, time spent reading during certain portions of the day, words that have been defined for the user previously, or words that may be helpful to define for the user in an upcoming reading session. In one embodiment, the information display module 320 displays information in the margin of text displayed on the client 110. In one embodiment, the information display module 320 displays how long it is expected to take a user to read a section of an eBook based on their average reading speed compared to other users and the overall average reading speed of the section of the eBook.

Figure 4:
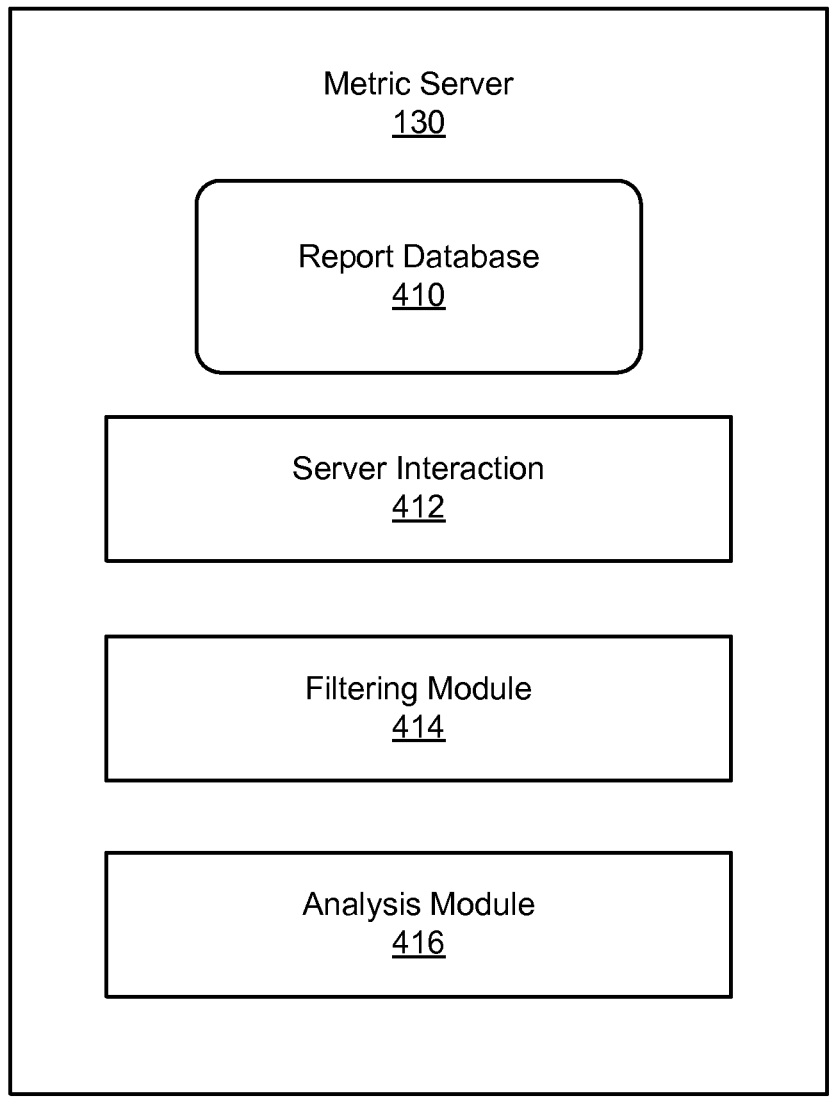
FIG. 4 is a high-level block diagram illustrating a detailed view of the metric server according to one embodiment.

FIG. 4 is a high-level block diagram illustrating a detailed view of the metric server 130 according to one embodiment. As shown in FIG. 4, multiple modules are included within the metric server 130. In some embodiments, the functions are distributed among the modules in a different manner than described herein. Moreover, the functions are performed by other entities in some embodiments, such as by the client 110 or reading module 112.

A report database 410 stores data reports received from the clients 110. As previously mentioned, the data reports include timing and action reports. In one embodiment, the report database 410 stores the reports keyed by the user identifier so that all reports associated with specific users can be identified. The report database 410 may also store the reports keyed by eBook or portions of an eBook, by client 110 or by other keys. In one embodiment, users may choose to provide no information to the metric server 130. If a user does not provide permission to the metric server 130 to gather information, the metric server 130 will not retain any user information and will not gather data about that user.

In one embodiment, the report database 410 also stores timing information and action information generated by the metric server 130 from the received reports. The timing information may include information associated with specific users, such as average or other reading speeds and speed modifiers describing the users' reading speeds relative to the reading speed of other users. In addition, the timing information may include information associated with specific eBooks. The eBook timing information may include reading times (e.g., average reading times) for portions of an eBook. Thus, the eBook timing information may include the average reading times for entire eBooks, chapters of eBooks, and paragraphs, sentences, or other sections of eBooks. The action information may include the number of times or frequency of an action occurring at a particular location in the eBook. For example, the percentage of readers that look up the definition of a word may be stored. This data may be stored for the word globally among all books, within a single eBook, or for specific instances of the word in an eBook.

In one embodiment, the timing information and action information in the report database 410 is updated as new data reports are received from the clients 110. Alternatively, the information may be updated periodically, after a certain amount of time has passed, after a certain number of reports have been received, or based on other factors. The information may also be weighted based on the number of reports received for a particular user/eBook or based on other factors.

A server interaction module 412 receives data reports from the clients 110 and stores the reports in the report database 410. The data reports include timing reports and action reports. In one embodiment, permission is requested from the user before receiving data reports from the clients 110. In addition, the server interaction module 412 transmits timing information, action information, and other information generated by the metric server 130 to the clients 110. Additionally, the server interaction module 412 may send this information to other entities, such as publishers, distributors, or other entities interested in the information. In one embodiment, if a user does not provide explicit approval to transmit information to other entities, such as by interacting with a button on an approval dialog box displayed on the client 110, information will not be transmitted to other entities.

A filtering module 414 filters data reports received from the clients 110 to discount reports that are likely erroneous or inaccurate. The filtering module 414 may filter out timing reports that indicate abnormally high or low reading time intervals. These timing reports may result from abnormalities such as the user rapidly flipping forward through the pages of text or being interrupted while reading a page of text. In one embodiment, the filtering module 414 compares reading time intervals in the timing reports with lower and upper thresholds and filters out timing reports not falling within the thresholds. The thresholds can be based on the timing information stored in the timing database or other factors.

Further, the filtering module 414 may filter action reports received from the clients 110 to remove reports containing actions that are likely performed mistakenly or contain data that will undesirably skew data stored in the report database 410. If actions are performed by a user that may skew the stored data, the action report reporting the actions may be weighted less than the actions of other users. For example, if a user looks up the definition of a large number of words on a page, the user may simply be testing the definition feature and the data may be discounted by removing it or giving it lower weight than data from other users. The functions of filtering module 414 may also be incorporated within the timing modules 112 of the clients 110 or any other module.

An analysis module 416 analyzes the data reports in the report database 410 and generates action information and timing information. The types of analysis and information generated by the analysis module 416 can vary in different embodiments. The generated information is stored in the report database 410.

In one embodiment the analysis module 416 generates action information by analyzing the data reports to identify actions frequently performed by readers of particular eBooks and/or passages in eBooks relative to other actions. The analysis module 416 may then generate action information for automatically performing these frequently-performed actions for other users reading the eBooks and/or passages. The analysis module 416 may use a variety of different techniques to identify the frequently-performed actions. One embodiment of the analysis module 416 uses machine learning, e.g., classifier-based techniques, to identify relationships between actions, eBooks, and users and then generates action information based on these relationships. The relationships may be based on characteristics of the users (e.g., reading speed), characteristics of the actions (e.g., different actions may be performed based on different types of relationships), and characteristics of the eBooks (e.g., different types of actions may be performed for different types of eBooks). For example, the analysis module 416 may use machine learning to detect that readers who read non-fiction books below a particular reading speed tend to request definitions of certain words, and then generate action information that automatically displays definitions of those words if a reader's reading speed while reading a non-fiction book is below the particular speed.

Similarly, the analysis module 416 may generate action information for a particular action if the analysis indicates that more than a threshold amount of users perform the action. Thus, if the analysis performed by the analysis module 416 indicates that a threshold amount (e.g., 75%) of users request a definition of a particular word in a passage of an eBook, the analysis module may generate action information causing the definition of the word to be displayed when other people read the passage containing the word. Different actions may use different thresholds. In addition, the thresholds may vary based on characteristics of the users, characteristics of the actions, and characteristics of the eBooks.

The analysis module 416 analyzes the data reports to generate timing information describing reading speeds of individual and aggregate users. To this end, the analysis module 416 calculates statistics from timing reports describing users' reading speeds. For example, the analysis module 416 may calculate a user's average reading speed by dividing the number of words in a portion of one or more eBooks by the amount of time required by the user to read the portion.

Similarly, the analysis module 416 may generate combined timing information for a group of users of the clients 110. As with individual readers, the combined timing information is a statistical measure describing the time required by the group of users to read a portion of one or more eBooks. The analysis module 416 may select the group of users for which the combined timing information is generated based on a variety of factors. The analysis module 416 may select a group of users who have read a particular eBook or set of eBooks. The analysis module 416 can use this group of users to generate, e.g., the average reading speed of the group of users for the eBook. The analysis module 416 may also select groups of users based on demographic information of the users, geographic locations of the users, etc. This technique may prove useful, for example, in determining the reading difficulty of an assignment to a class. A teacher may assign an eBook to a class and decide how difficult passages of the text were to read based on metrics such as time spent reading and amount of dictionary use.

Further, the analysis module 416 may generate timing information associated with specific types (e.g., genres) of eBooks. In general, reading speeds of users often vary for different types of eBooks. For example, the average user's reading speed might be slower for a mathematical textbook than for a science fiction novel. Hence, the analysis module 416 generates timing information that describes the reading speeds for specific types of eBooks for users and groups of users.

The analysis module 416 may represent the timing information in multiple ways. For example, the timing information may indicate the reading speed of a particular user as a scale factor relative to a base reading speed. The base reading speed, may be determined based on reading speeds of a group of users. For example, the timing information may describe a user's reading speed as being 110% of the base reading speed.

The analysis module 416 may account for actions performed by the users when generating timing information. Actions performed by users while reading eBooks may affect the users' reading speeds. For example, a user that looks up a dictionary definition of a word in a passage will likely pause to read the definition, thereby lowering the user's reported reading speed for the passage. An embodiment of the analysis module 416 therefore correlates the timing and action reports received from clients 110 so that it may modify or adjust the users' reading speeds in the timing information determined in response to the reports. For example, the analysis module 416 may filter out or otherwise discount timing reports from a client 110 if the action reports from the client indicate actions were performed while the passages described in the timing reports were being read.

The analysis module 416 may also generate additional information from its analysis of the data reports. For example, the analysis module 416 may determine points in eBooks at which users tend to start or stop reading. Identifying when a user tends to stop reading, and not finish, a book or article can prove useful in trying to identify what causes users to cease reading. Additionally, the analysis module 416 may determine how often the definition of a word is looked up. Statistical data such as this may be provided for a specific instance of a word, or all instances in a portion of a book, an entire book, a genre of books, or overall in all analyzed eBooks. Knowing how often the definition of a word is requested by users can aid in assessing readability of writings or aid authors in improving the readability of future writings. Authors, publishers, distributors, and marketers may use this and other information to examine how users tend to read the eBooks. In one embodiment, permission is requested from a user before performing analysis on data received from one or more clients of the user.

Figure 5:
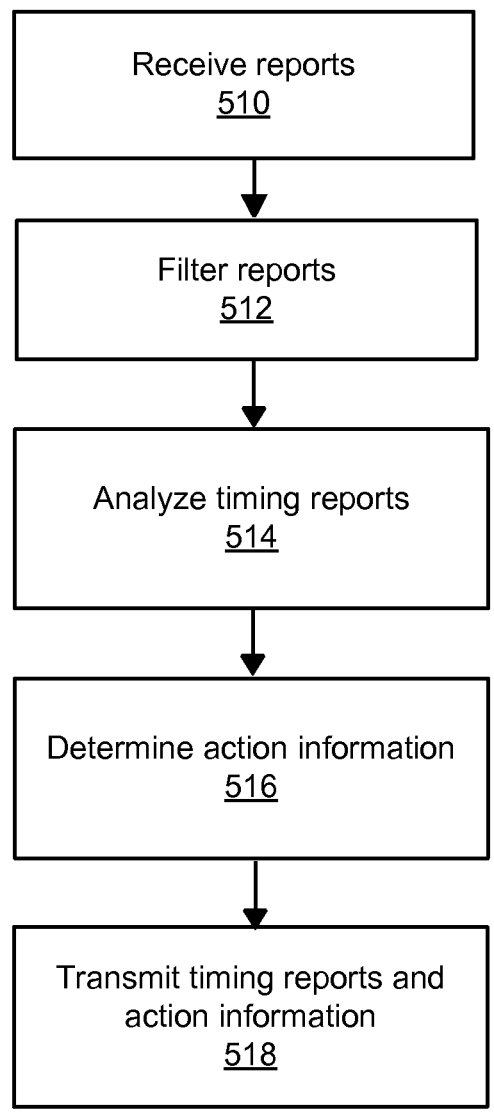
FIG. 5 is a flowchart illustrating a method of analyzing eBook reading metrics to generate action information that is transmitted to a client according to one embodiment.

FIG. 5 is a flowchart illustrating a method of analyzing eBook reading metrics to generate action information that is transmitted to a client according to one embodiment. While this description ascribes the steps of the method to the metric server 130, the clients 110 or other entities can perform some or all of the steps in other embodiments. In addition, the method can perform the steps in different orders or include different steps.

In step 510, the metric server 130 receives data reports, such as timing and action reports, from the clients 110. The timing reports describe user reading time intervals for portions (e.g., pages) of eBooks. The action reports describe actions performed by users at certain locations within the eBooks. A given report may include identifiers of the client 110, user, and eBook, a description of the text displayed on the page associated with the report, the time interval, a description of an action performed on the client, and the time at which the action was performed or the time interval occurred. Users may be provided with an opportunity to control whether data reports are measured and/or transmitted to the metric server 130. In step 512, the metric server 130 filters the reports to remove reports that are likely erroneous or inaccurate, and stores the remaining reports in the report database 410.

In step 514, the metric server 130 analyzes the timing reports to generate timing information describing reading speeds of users. In step 516, the metric server 130 analyzes the action reports to identify actions frequently performed by users reading eBooks at the clients 110, and generates action information for automatically performing these actions at other clients. The metric server 130 transmits timing and action information to the clients 110. A client 110 may use the received information to automatically perform an action when a user reads a particular passage of a particular eBook. For example, the action may indicate to automatically display the definition of a word when a user reads a particular passage of a particular eBook containing the word. By using the timing information, the client 110 can determine when the user is reading the passage and automatically display the definition at that time.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for tracking and utilizing advanced reading metrics as described herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

The invention claimed is:

1. A computer-implemented method of using eBook reading metrics to generate action information comprising:
   receiving data reports from a plurality of clients, the data reports comprising action reports describing actions performed by a plurality of users of the clients at locations within an eBook;
   analyzing the data reports to identify a same action that is performed by the plurality of users of the clients at an identified same location within the eBook;
   generating action information for automatically performing the identified action at the identified location within the eBook, the action information indicating to automatically display information to a user of a client when the user reads the identified location within the eBook; and
   transmitting the action information to the client, wherein the client is adapted to use the action information to automatically perform the identified action at the identified location within the eBook.

2. The method of claim 1, wherein analyzing the data reports to identify the action that is performed by the users of the clients at the location comprises identifying an action that is frequently performed by the users of the clients relative to other actions.

3. The method of claim 1, wherein the received data reports comprise timing reports describing reading speeds of users of the clients, further comprising:
   analyzing the data reports to determine timing information indicating a reading speed of the user of the client; and
   transmitting the timing information to the client, wherein the client is adapted to use the timing information in combination with the action information to automatically perform the action at the location within the eBook.

4. The method of claim 3, wherein the client is adapted to use the timing information to determine when the user of the client is reading the location within the eBook at which the action is to be automatically performed.

5. The method of claim 3, wherein analyzing the data reports to determine timing information comprises:
   correlating timing reports and action reports received from the client; and
   modifying the determining timing information indicating the reading speed of the user of the client responsive to the correlated timing and action reports.

6. The method of claim 1, wherein the automatically displayed information includes one or more of: a definition of a word at the location within the eBook, a translation of a word at the location within the eBook, and an annotation at the location within the eBook.

7. A computer-implemented system for using eBook reading metrics to generate action information comprising:
   a non-transitory computer-readable storage medium having executable computer program instructions comprising instructions for:
      receiving data reports from a plurality of clients, the data reports comprising action reports describing actions performed by a plurality of users of the clients at locations within an eBook;
      analyzing the data reports to identify a same action that is performed by the plurality of users of the clients at an identified same location within the eBook;
      generating action information for automatically performing the identified action at the identified location within the eBook, the action information indicating to automatically display information to a user of a client when the user reads the identified location within the eBook; and
      transmitting the action information to the client, wherein the client is adapted to use the action information to automatically perform the identified action at the identified location within the eBook; and
   a processor for executing the computer program instructions.

8. The system of claim 7, wherein analyzing the data reports to identify the action that is performed by the users of the clients at the location comprises identifying an action that is frequently performed by the users of the clients relative to other actions.

9. The system of claim 7, wherein the received data reports comprise timing reports describing reading speeds of users of the clients, the instructions further comprising:
   analyzing the data reports to determine timing information indicating a reading speed of the user of the client; and
   transmitting the timing information to the client, wherein the client is adapted to use the timing information in combination with the action information to automatically perform the action at the location within the eBook.

10. The system of claim 9, wherein the client is adapted to use the timing information to determine when the user of the client is reading the location within the eBook at which the action is to be automatically performed.

11. The system of claim 9, wherein analyzing the data reports to determine timing information comprises:
   correlating timing reports and action reports received from the client; and
   modifying the determining timing information indicating the reading speed of the user of the client responsive to the correlated timing and action reports.

12. The system of claim 7, wherein the automatically displayed information includes one or more of: a definition of a word at the location within the eBook, a translation of a word at the location within the eBook, and an annotation at the location within the eBook.

13. A non-transitory computer-readable storage medium storing executable computer program instructions for using eBook reading metrics to generate action information, the instructions performing steps comprising:
   receiving data reports from a plurality of clients, the data reports comprising action reports describing actions performed by a plurality of users of the clients at locations within an eBook;
   analyzing the data reports to identify a same action that is performed by the plurality of users of the clients at an identified same location within the eBook;
   generating action information for automatically performing the identified action at the identified location within the eBook, the action information indicating to automatically display information to a user of a client when the user reads the identified location within the eBook; and
   transmitting the action information to the client, wherein the client is adapted to use the action information to automatically perform the identified action at the identified location within the eBook.

14. The computer-readable storage medium of claim 13, wherein analyzing the data reports to identify the action that is performed by the users of the clients at the location comprises identifying an action that is frequently performed by the users of the clients relative to other actions.

15. The computer-readable storage medium of claim 13, wherein the received data reports comprise timing reports describing reading speeds of users of the clients, the steps further comprising:
   analyzing the data reports to determine timing information indicating a reading speed of the user of the client; and
   transmitting the timing information to the client, wherein the client is adapted to use the timing information in combination with the action information to automatically perform the action at the location within the eBook.

16. The computer-readable storage medium of claim 15, wherein the client is adapted to use the timing information to determine when the user of the client is reading the location within the eBook at which the action is to be automatically performed.

17. The computer-readable storage medium of claim 13, wherein the automatically displayed information includes one or more of: a definition of a word at the location within the eBook, a translation of a word at the location within the eBook, and an annotation at the location within the eBook.

* * * * *

UNITED STATES PATENT AND TRADEMARK OFFICE
CERTIFICATE OF CORRECTION

PATENT NO.        : 9,123,053 B2  
APPLICATION NO.   : 13/709262  
DATED             : September 1, 2015  
INVENTOR(S)       : Abraham Phelps Murray et al.

Page 1 of 1

It is certified that error appears in the above-identified patent and that said Letters Patent is hereby corrected as shown below:

On the title page item (72), Inventors, delete "David Eric Staff," and insert -- David Eric Saff --.

Signed and Sealed this  
Twenty-ninth Day of December, 2015

Michelle K. Lee  
*Director of the United States Patent and Trademark Office*